United States Patent
Mohan et al.

(10) Patent No.: US 12,244,612 B2
(45) Date of Patent: Mar. 4, 2025

(54) AUTOMATED INCIDENT RESPONSE PROCESS AND AUTOMATED ACTIONS

(71) Applicant: SCHLUMBERGER TECHNOLOGY CORPORATION, Sugar Land, TX (US)

(72) Inventors: Apurva Mohan, Sugar Land, TX (US); Himali Saxena, Sugar Land, TX (US); Gian-Marcio Gey, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 386 days.

(21) Appl. No.: 16/833,257

(22) Filed: Mar. 27, 2020

(65) Prior Publication Data
US 2020/0344249 A1   Oct. 29, 2020

Related U.S. Application Data (60) Provisional application No. 62/824,749, filed on Mar. 27, 2019.

(51) Int. Cl.
| | |
|---|---|
| *H04L 29/06* | (2006.01) |
| *G06N 5/04* | (2023.01) |
| *G06N 20/00* | (2019.01) |
| *H04L 9/40* | (2022.01) |

(52) U.S. Cl.
CPC .......... *H04L 63/1416* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 5,293,453 | A * | 3/1994 | Frazier | G06F 11/08 341/51 |
| 5,983,161 | A * | 11/1999 | Lemelson | G01S 19/11 340/436 |
| 6,502,132 | B1 * | 12/2002 | Kumano | H04L 43/10 709/224 |
| 7,325,185 | B1 * | 1/2008 | Szor | G06F 21/55 713/188 |
| 7,340,597 | B1 * | 3/2008 | Cheriton | G06F 21/554 713/168 |
| 10,387,899 | B2 * | 8/2019 | Fighel | G06F 11/079 |
| 10,681,071 | B1 * | 6/2020 | Pendergast | H04L 63/1458 |
| 10,701,103 | B2 * | 6/2020 | Aggarwal | H04L 63/1425 |

(Continued)

FOREIGN PATENT DOCUMENTS

CN    109246072 A  *  1/2019

OTHER PUBLICATIONS

Mocanu et al., Mocanu et al., "Scalable training of artificial neural networks with adaptive sparse connectivity inspired by network science", Nat Commun 9, 2383, 2018) (Year: 2018).*

(Continued)

*Primary Examiner* — Piotr Poltorak
(74) *Attorney, Agent, or Firm* — Jeffrey D. Frantz (57) ABSTRACT

An automated incident response process that is configured to monitor data from at least one internet connected apparatus, use artificial intelligence to determine if the data indicates a fault and perform a playbook of actions if a fault is determined.

20 Claims, 4 Drawing Sheets

(56) References Cited

U.S. PATENT DOCUMENTS

| | | | |
|---|---|---|---|
| 10,866,877 B2* | 12/2020 | Harer | G06N 3/08 |
| 2002/0144129 A1* | 10/2002 | Malivanchuk | G06F 21/564 |
| | | | 713/188 |
| 2014/0282871 A1* | 9/2014 | Rowland | H04L 63/20 |
| | | | 726/3 |
| 2014/0331274 A1* | 11/2014 | Bitton | H04L 63/0227 |
| | | | 726/1 |
| 2017/0140259 A1* | 5/2017 | Bergstra | G06N 3/084 |
| 2018/0198765 A1* | 7/2018 | Maybee | G06F 12/123 |
| 2018/0284758 A1* | 10/2018 | Cella | G06Q 30/0278 |
| 2018/0341493 A1* | 11/2018 | Roy | G06N 3/02 |
| 2019/0140906 A1* | 5/2019 | Furuichi | H04L 67/12 |
| 2019/0188797 A1* | 6/2019 | Przechocki | G06Q 40/08 |
| 2019/0279081 A1* | 9/2019 | Pham | G06N 3/08 |
| 2020/0045075 A1* | 2/2020 | Kliger | H04W 12/12 |
| 2020/0143293 A1* | 5/2020 | Iftimie | G06F 9/5072 |
| 2020/0236086 A1* | 7/2020 | Patil | G06F 9/45558 |
| 2021/0006583 A1* | 1/2021 | Ryabenkiy | H04L 63/1425 |
| 2021/0357731 A1* | 11/2021 | Van de Wiele | G06N 3/047 |

OTHER PUBLICATIONS

Hardesty, "Explained: Neural networks Ballyhooed artificial-intelligence technique known as "deep learning" revives 70-year-old idea.", found at https://news.mit.edu/2017/explained-neural-networks-deep-learning-0414, Apr. 2014. (Year: 2014).*

Zolotukhin et al., "On Artificial Intelligent Malware Tolerant Networking for IoT", 2018 IEEE Conference on Network Function Virtualization and Software Defined Networks (NFV-SDN): SNS2018—International Workshop on Security in NFV-SDN @ IEEE NFV-SDN 2018 (Year: 2018).*

Wang et al., "Neural Cleanse: Identifying and Mitigating Backdoor Attacks in Neural Networks", 2019 IEEE Symposium on Security and Privacy, DOI 10.1109/SP.2019.00031, Sep. 2019 (Year: 2019).*

* cited by examiner

AUTOMATED INCIDENT RESPONSE PROCESS AND AUTOMATED ACTIONS

CROSS-REFERENCE TO RELATED APPLICATIONS

The present application claims priority to U.S. Provisional Application No. 62/824,749, dated Mar. 27, 2019, the entirety of which is incorporated by reference.

FIELD

Aspects of the disclosure relate to internet operations and components related to internet operations. More specifically, aspects of the disclosure relate to an internet-based security system that uses artificial intelligence to detect security events.

BACKGROUND

Cybersecurity in industrial internet of the things (IIoT) relies on old network style cybersecurity methods. These conventional methods lack visibility of the IIoT network. For example, a majority of edge devices are not monitored in real time. Traditional monitoring mechanisms have not been implemented in the IIoT domain because they are not a good fit for security monitoring under IIoT deployment constraints. Typical monitoring systems send a large amount of data for analysis to backend servers. Also, they do not have the overall domain and context information for IIoT environments to adequately detect threats. Due to differing constraints, such as the inability to accurately monitor activities, conventional security methods have a large lack of security. As time passes and the threats increase from external sources, these conventional systems become more "at risk" for companies. When companies have vast networks of conventional systems, the amount of exposure becomes extremely problematic as large scale business interruption is possible.

Artificial Intelligence (AI) event analysis can help prevent these deficiencies. AI systems can examine a large amount of security event data that correlates with domain knowledge and contextual data. AI may be used to establish whether the security events are part of a security incident or not.

The security incidents that are received by a security operations center (SOC) are processed on an automation platform using automated playbooks. These playbooks may have several functions. Generally, the playbooks define how a system will respond to the security incident. Such playbooks may call for using automated actions. These automated actions are taken on the IIoT devices in the field to contain the incident. Also, the automated actions can respond to security incidents to recover from them or to take the system to a safe state. Since IIoT environments deal with cyber-physical systems, it is important to ensure that the automated actions do not have any unintended consequences. As such, the automated actions are built on a case by use case basis.

The agents that implement automated actions are privileged systems components. As such, it is ensured that there is "end to end" trust and security in the system so that the automated actions cannot be compromised by an adversary to compromise the IIoT system itself.

There is a need to provide apparatus and methods that are easier to operate than conventional apparatus and methods and will have superior performance compared to conventional apparatus and methods.

There is a further need to provide apparatus and methods that do not have the drawbacks discussed above, such as the inability to adequately bring the overall computer system to a safe configuration without large need for user interaction.

There is a still further need to reduce economic costs associated with operations and apparatus described above with conventional tools such that the automated incident response is adaptable to changes in the overall system without large scale economic costs related to system configuration changes.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method of performing a computer network action is disclosed. The method may comprise receiving data from at least one internet connected device located in a field and performing at least one artificial intelligence analysis of the data received from the at least one internet connected device. The method may also comprise determining when a fault condition exists in the at least one artificial intelligence analysis of the data received from the at least one internet connected device. The method may also provide for when the fault condition exists, performing an automated response to the fault condition through the artificial intelligence analysis. The method may also provide for continuing to receive further data from the at least one internet connected device located in the field, when the fault condition does not exist.

In another embodiment, a method of monitoring a computer network and performing an artificial intelligence-based action is disclosed. The method may comprise at least one of receiving data from at least one internet connected device and querying data from the at least one internet connected device at a cloud-based monitoring service. The method may also provide for performing at least one artificial intelligence analysis of the data received from the at least one internet connected device in the cloud-based monitoring service. The method may also provide for determining a presence of a fault condition with the data based on the one artificial intelligence analysis of the data received from the at least one internet connected device. The method may further provide for when the fault condition exists, notifying a security operations center of the fault. The method may further provide for at the security operations center, performing an automated response to the fault condition changing at least one parameter of the network and the at least one device. The method may also provide for continuing to receive further data from the at least one internet connected device located in the field, when the fault condition does not exist.

In another embodiment, an apparatus for performing an automated incident response for a network is disclosed. The apparatus may comprise an automated incident management system configured to manage incidents received from the network, an automated incident handling system configured to conduct automated actions in a network, the automated actions specified by a playbook, wherein the automated incident handling system is configured to change at least one parameter of the network and a security incident event management system configured to aggregate and correlate incidents received from the network.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and shall not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Figure 1:
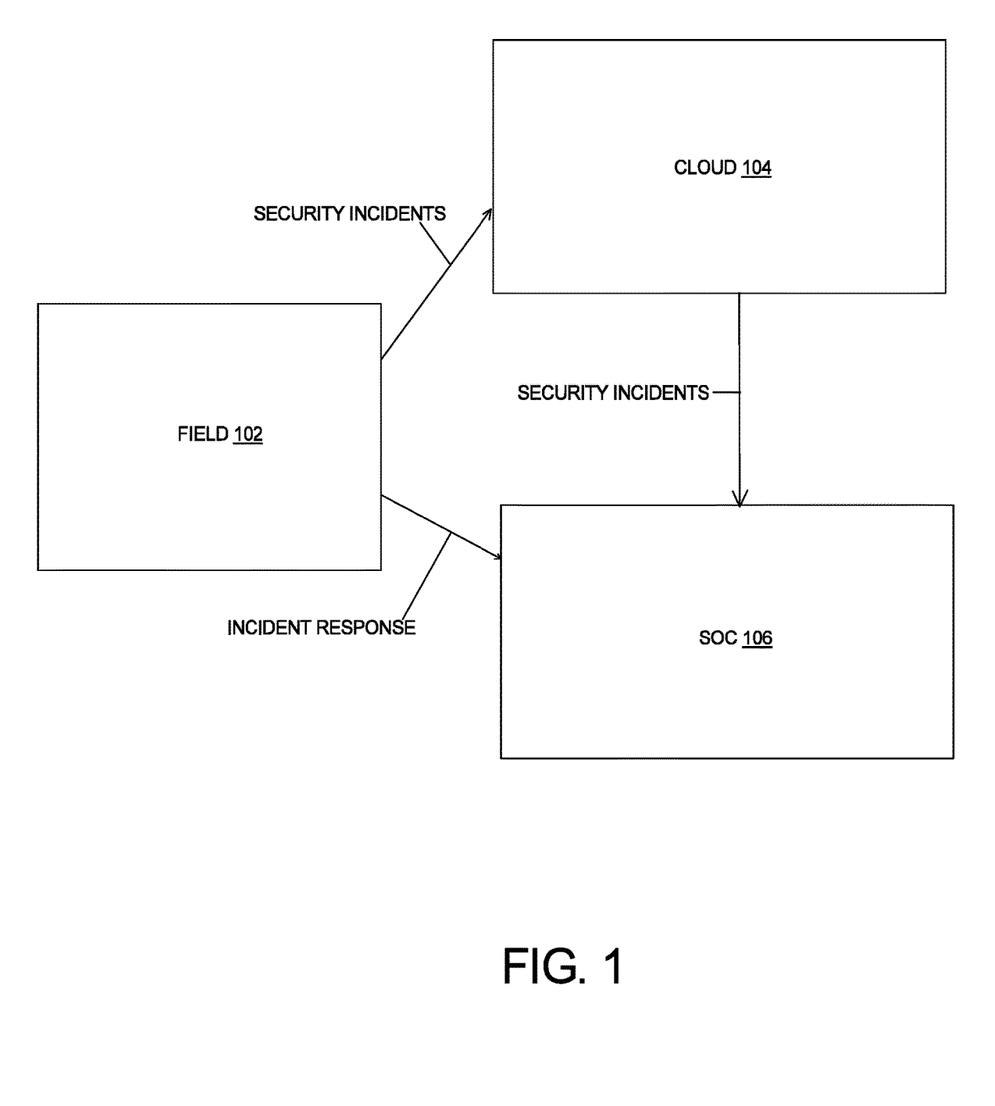
FIG. 1 is a diagram of an AI assisted event detection in conformance with one example embodiment of the disclosure.

FIG. 1 depicts a diagram of automated incident assisted event detection. By way of definition, a "field" 102 is a location where devices (called edge devices) are located. Other components may also be located in the field 102, such as a gateway(s). A gateway is a location that is configured to send information to a memory arrangement, such as a cloud 104 computing and storage network. This location is provided at the edge of a computer network that allows entrance to the internal network. The gateway can be constructed of software, hardware and/or a combination of both software and hardware. The gateway may include security features, such as a firewall and proxy servers, in example embodiments. As will be understood, a firewall protects the internal computer network from unauthorized access. The firewall may be hardware, software and/or hardware and software based. In embodiments, the gateway may be a router-based component or a computer-based component.

During normal operation, the gateway or the environment in which the gateway is situated can encounter a change in environment or parameters. These changes can be related to operational variation or may be related to a security incident where unauthorized attempts at network access are attempted. As the causes of the change can have profound impacts on the computer network, it is necessary to determine the nature of the change and if that change can negatively impact the processes that are being accomplished on the computer network.

In one embodiment, the presence of a security incident is determined by examining the security events from the IIoT devices and the network. Data from the IIoT devices and the network can vary. Non-limiting example embodiments of device security data may include attempted log ins, brute force attacks on authentication, file system changes, compliance and changes in compliance protocols, and parameter changes that are sent to the cloud 104.

In embodiments, the cloud 104 sends this security related data, to a security analytics engine. The security analytics engine analyzes the received security related data and establishes whether an incident happened or not. To help in evaluation, different criteria may be used by network administrators as thresholds of acceptance for security related incidents. For example, if a single attempt is made to access a computer network and a wrong password has been entered by a user from a query sent by the network, a mistake may have been generated by a bona fide user, rather than a malicious attack. It may be programmed, therefore by a system architect that a threshold of less than three (3) failed log-ins is required before a security response is initiated.

Figure 3:
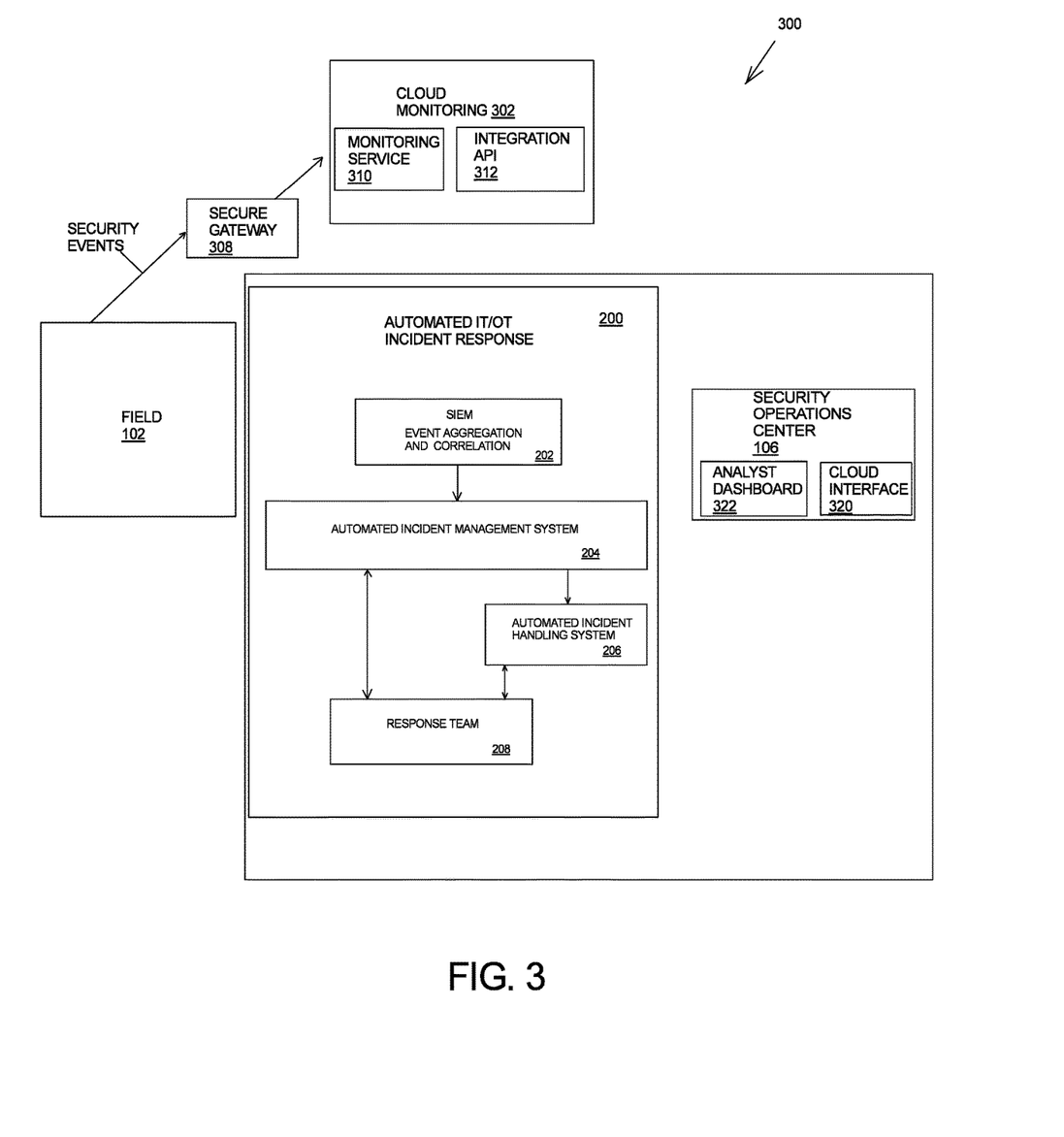
FIG. 3 is a diagram of a detailed AI event detection system in one example embodiment of the disclosure.

If a security incident is detected (due to the preset threshold created by the system architect), notification of the security incident is sent to the security operations center ("SOC") 106 for response. The SOC 106 may be a separate stand-alone computer system or it may be integrated in with a server or other computing arrangement configured with access to the network. Referring to FIGS. 1 and 3, a dashboard 322 is provided for analysts such that events that are triggered are retained for review by engineers. The SOC 106 is further configured with a cloud interface 320 such that interface actions are controlled through this interface 320.

As security incidents can vary in type and scope, the SOC 106 may be configured as a program and/or automated tool to run programs or vary network parameters in the event of a valid security incident. The automation tool in the SOC 106 will run the relevant security incident response programs and/or actions. These programs and/or actions are determined by preset or preprogrammed actions called "playbooks" that are used to determine the appropriate actions. These actions are then triggered automatically by the playbook. In other embodiments, a notification is sent to an analyst such that manual actuation by the analyst is achieved. These actions are transmitted to privileged modules on the IIoT devices that execute them. The automated actions will be often followed up by manual actions in the field 102 by operations personnel.

Figure 2:
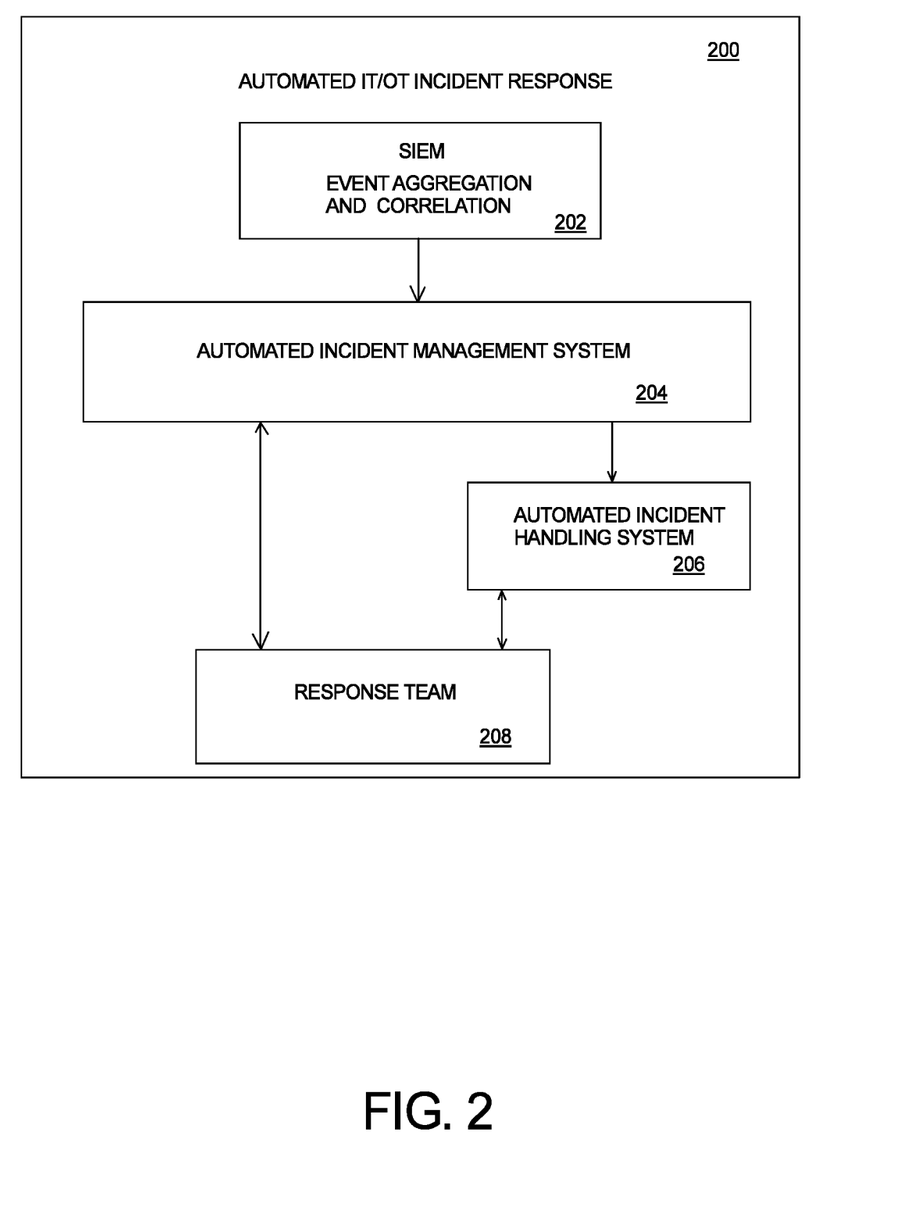
FIG. 2 is an automated incident response module in conformance with another example embodiment of the disclosure.

Referring to FIG. 2, an example automated incident response module 200 is disclosed. In this non-limiting embodiment, the response module 200 can include a security incident event management system 202. The security incident event management system 202 provides functions of event aggregation and correlation.

The security incident event management system 202 may be configured to conduct automated actions through an automated incident management system 204. An example of automated action that may be taken is that of a web server handling IIoT edge devices that are sending numerous outbound connections. These outbound connections may be considered potential security related events if elected by a system architect. The related security events are monitored by the monitoring tool and data pertaining to these potential security related events are transmitted to the SOC 106.

The SOC 106 is configured with an automation tool, namely an automated incident handling system 206. The automated incident handling system 206 in the SOC 106 is configured to perform a relevant playbook. In one example embodiment, the relevant playbook may be coded such that the appropriate action will be to shut down the web server until further investigation can be performed. After this investigation is conducted, the web server can then be started again. Other actions are possible, wherein an advanced action can perform remote attestation of the web server and update the web server if the local copy or programming is corrupted. The web server can then be automatically restarted.

The security incident event management system 202 then sends the correlated data to the automated incident management system 206. The automated incident management system 206 runs a series of playbooks on the outputs and sends the finding to the response team or to the automated incident handling system 206.

FIG. 3 depicts a detailed AI event detection system 300. The AI event detection system 300 can include the field 102 connected to the cloud 104 via a gateway 308. The monitoring tool or monitoring service 310 correlated the security events with known attack patterns. The monitoring service 310 may include the security analytics engine, described in relation to FIG. 1. Also, any anomalous activity different from the normal traffic pattern is considered suspicious. The cloud 104 will monitor the data and send suspect data to the automated incident response module 200, such as the described above, sends outputs to the response team and at the same time takes automated actions.

Referring to FIG. 3, cloud monitoring 302 is conducted of the field 102 through a cloud monitoring service 310. The cloud monitoring 302 may include capabilities to not only monitor devices located in the field 102, but also provide an interconnection to other computers so that playbooks may be shared among authorized networks, as explained below. An integration application programming interface (API) 312 is provided to provide a pathway upon which features and functionality are controlled. Thus, third party access may be granted through the API 312.

An AI event detection can entail, for example, a SSH (secure shell) login that occurs on the IIoT edge device. In this hypothetical event, no SSH connections are allowed for the network. Since no SSH connection should be allowed, this attempted login indicates that the SSH service was left enabled after the last access. The playbook can determine if SSH is not allowed then the best course of action is to send an automated action. Other playbooks can be developed for other events in the same manner. The AI will select which playbook should be executed for the incident and playbook, which is a set of computer instructions to cause a processor to take appropriate action per the predetermined playbook.

The methods and equipment described above are applicable to various types of attacks on computers and IIoT devices. These attacks may include, according to Table 1.

TABLE 1

| Type of Attack | Malicious Action | Typical Recommended Action |
|---|---|---|
| 1) Reconnaissance & Probing | Typical Action by Computer or Individual Probing Network weakness prior to attack | Notification to SOC 106 of increased network activity |
| 2) Delivery & Attack | The desired action is to deliver a new addition to a network online for spying or continuous infection | Denial of Requested Action of addition to network |
| 3) System Compromise | Attacker seeks to gain additional network access and accumulate additional computing resources | Limit access to additional computer resources to prevent internal or potential use of computer resources to create external attack. |
| 4) Installation of Exploited System | Exploitation of vulnerabilities in targeted systems and installation of software for purposes other than network activities | Limitation of targeted systems through monitoring. Prevention of capabilities for software installation for purposes other than granted by computer architect. |
| 5) Malware Infection | Installation of malicious code to perform actions of attacker | Automatic scanning and removal of malicious code installed by others |

TABLE 1-continued

| Type of Attack | Malicious Action | Typical Recommended Action |
| --- | --- | --- |
| 6) Distributed Denial of Service | Brute force attack from outside computer network through internet provider to shut down service. | Configure web servers to protect against flood requests. Coordinate with internet service provider for notification and blocking of IP source responsible for attack. |
| 7) Diversions of Distributed Denial of Service | A computer diversion to take resources other away from attacks ongoing or planned by malicious attacker. | Increase monitoring of situation and investigate abnormal activities within network. Notify internet service provider of malicious IP service. |
| 8) Unauthorized Access to Network or Network Component | Infiltrate computer system to gain additional access to computer functions not previously capable of being accessed or to network components that were not previously accessible. | Maintain list of security sensitive installations and provide defense in depth for most security related systems. Monitor unauthorized access and close network access to sensitive components. |
| 9) Breach resulting from insider malicious actor | Malicious attempt by credentialed individual to access data or computer components. | Identify credentialed user account being used for access. Monitor access. Shut down access to portions of computer system deemed safety significant or data access to unauthorized access. |
| 10) Changes in privilege access that are unauthorized | Attempt by insider or other to gain additional privileges to computer network structures and programs. | Monitor actions and restrict access to pre-authorized security function levels. |
| 11) False Alarm | Various | Various |

Using an artificial intelligence configuration for detection also has significant advantages compared to conventional monitoring systems. Computer architects can not only monitor activities of the network but can also designate safety sensitive areas where compromise would have the largest business risk. Thus, in the case of multiple events occurring at the same time, the AI engine may be used to prioritize the risks associated with the activities being performed at the time. The AI engine can maintain a database of alerts, over time, such that similar or recurring problems that are maintenance related are relegated to a lower overall significance compared to other more safety significant risks. Such categorizing of events allows systems personnel to more efficiently use their respective time resolving more safety significant issues, rather than having to categorize and sort through multiple events that may or may not be safety significant.

In embodiments, the AI systems used may be configured as a neural network. These neural networks may be configured to aid in selecting actions that are appropriate for event occurrence. As time passes, the neural network may have a learning capability such that repeated iterations of typical events are more properly categorized. Thus, the AI network may correctly predict corrective actions at a higher percentage than with a network that merely lists events or tasks to be accomplished.

Other advantages for using an automated, or AI based, incident response system is present. For each event monitored and resolved, playbooks may have cross-referenced information that allows the AI based system to monitor common components that are involved with the incidents. The AI may allow for determining common characteristics and common fault patterns between different investigations. Thus, for activities that do not seem to be related, the AI and automated actions may predict that components or specific processes need alternation through their continued failure over time. Using the automated incident response process also allows for proactive tuning of the computer network environment for better security. As the automated incident response process tracks events as they occur, duplicate investigations are eliminated as engineers may quickly identify such duplicate entries, thereby maximizing resources and minimizing inefficiency.

Aspects of the disclosure provide for each of the following stages in response to a security event. Aspects that may be handled by the automated incident response process and equipment associated with the process include identification of threats, containment of the security incident, eradication of the event, recovery of the event and follow-up of the event.

Actions related to recovery may be to identify damaged or potentially compromised sections of the network. Activities may include, but not be limited to, reformatting and reloading systems, applying software patches and/or restoring data from a known good backup location. Other activities may include setting reminders to install patches or contacting software providers for issues that must be resolved with vendor assistance.

Actions conducted by the systems described may also be proactive in nature. As a non-limiting embodiment, tracking mechanisms may be used to determine a "root cause" analysis capability that will warn engineers of common necessary repetitive actions that caused the problem generation. For example, maintenance tracking may be performed. From time to time, maintenance activities must be performed on a computer network, where updated software must be installed. Running computers with outdated anti-viral protection may lead to vulnerabilities within the network. To this end, repeated security incidents may revolve around the outdated anti-viral protection. The automated incident response process may be configured to establish that the root cause for the problems are related to maintenance activities and that regular updates to the computer systems may resolve a number of these recurring issues. To this end, a predictive analysis may be performed, wherein if certain actions are conducted, a reduction in security issues will be noted. Computer operations can then be fine-tuned such that a balance is achieved between the costs of continual maintenance activities and responding to security issues as identified by the automated incident response process.

Although disclosed as a stand-alone process or network, other embodiments are possible. If networks are interconnected to some degree, information and/or data sharing may be conducted. To this end, such interconnection would allow for further predictive modeling as the data sample size for security responses would increase. The chances of a "new" security incident would decrease as playbooks may be shared or updated according to the threat encountered. For example, in events where a specific IP address has been attempting to conduct a denial of service security issue, information may be provided from one protected network to another more vulnerable network that may or may not have a playbook established for this threat. Engineers may then either manually generate a proactive network response to protect the network against the malicious threat or may develop a playbook that would handle the security issue, if the need arises.

The types of AI systems used can be varied. The AI system may replicate a biological neural network in order to learn to perform different tasks for the automated actions. For example, different nodes or artificial neurons may be created to allow for comparison and testing capability. The network that is established by this AI system may be updated such that a relative importance is assigned. Such "weights" for analysis may be modified over time to reflect identification of security threats that are more pronounced for the network than others. These security threats, when they are identified, may be ranked higher in the order of actions to accomplish than other lower ranked actions. Thus, playbooks may be set into a hierarchy based upon significant threat level. As the AI system may be created based upon a biological neural network, the system is capable of backward learning ("backpropagation") or taking errors from calculations and analysis and fine-tuning the system response after each successive threat. To this end, over time, the system weighs certain activities to be more vital than others.

As will be understood, criteria may be individually chosen by the system architect or engineers running the network on what activities are most important. For example, certain actions may require expenditure of capital that an organization or company does not have. To this end, engineers may prioritize cost as the overall most important function and try to operate the network and automated actions to minimize the costs of the automated actions. In other instances, if a possibility of a threat is great, system security may be chosen as the prime choice and therefore continuity of operations with playbooks developed for that advantage are enabled. Thus, playbooks may be created or used to achieve various stated goals. If the goals of a playbook are not currently what is required, the playbook may not be used or substituted for a playbook that has more viability of use during a given time frame.

Figure 4:
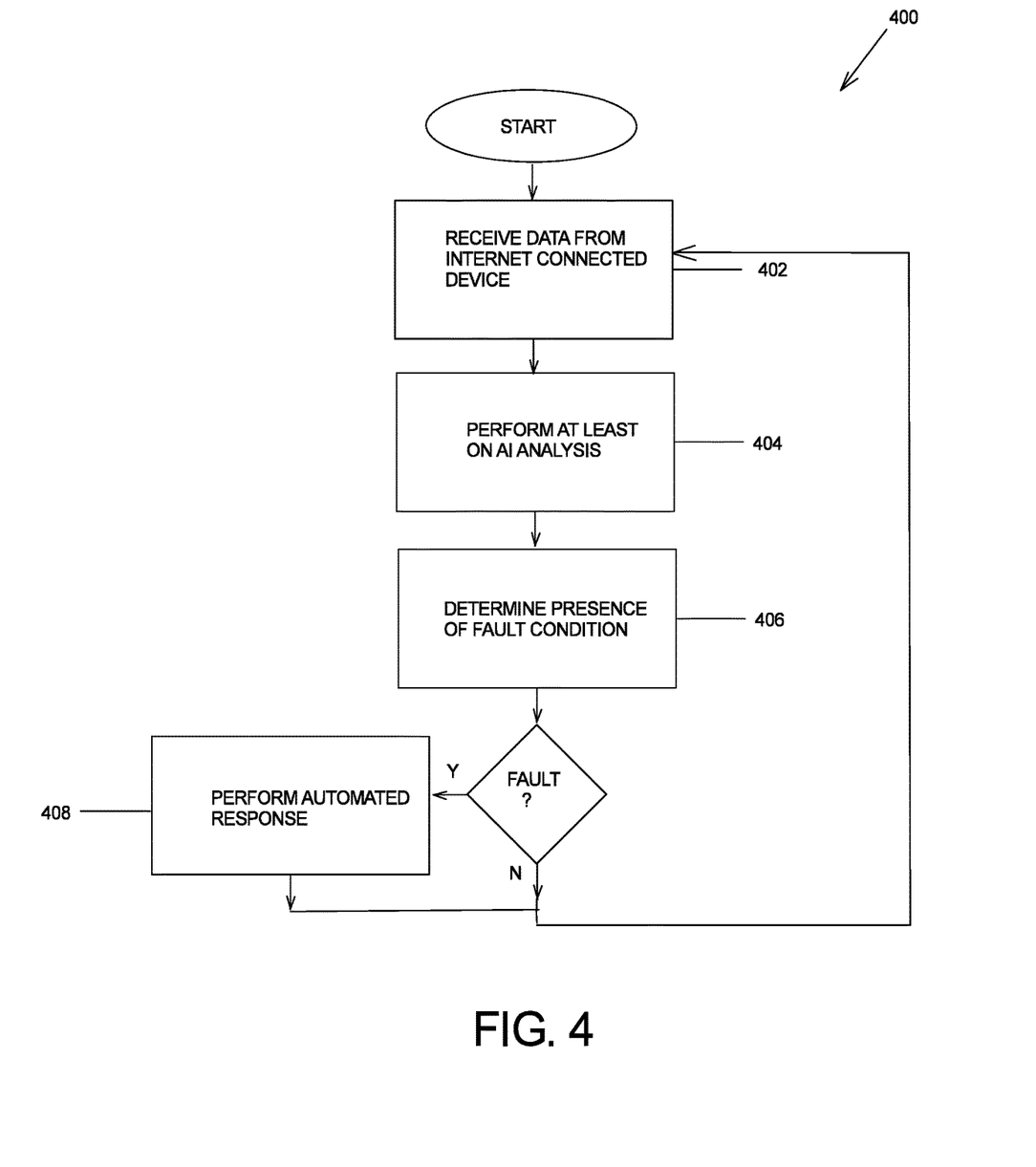
FIG. 4 is a method for event detection by an AI system in one example embodiment of the disclosure.

Referring to FIG. 4, a method 400 of performing a computer network action is disclosed. The method 400 may comprise, at 402, receiving data from at least one internet connected device located in a field. The method continues at 404 by performing at least one artificial intelligence analysis of the data received from the at least one internet connected device. At 406, the method further comprises determining when a fault condition exists in the at least one artificial intelligence analysis of the data received from the at least one internet connected device. At 408, the method continues wherein when the fault condition exists, perform an automated response to the fault condition through the artificial intelligence analysis. The method comprises, at 402, continuing to receive further data from the at least one internet connected device located in the field, when the fault condition does not exist.

In one example embodiment, a method of performing a computer network action is disclosed. The method may comprise receiving data from at least one internet connected device located in a field and performing at least one artificial intelligence analysis of the data received from the at least one internet connected device. The method may also comprise determining when a fault condition exists in the at least one artificial intelligence analysis of the data received from the at least one internet connected device. The method may also provide for when the fault condition exists, performing an automated response to the fault condition through the artificial intelligence analysis. The method may also provide for continuing to receive further data from the at least one internet connected device located in the field, when the fault condition does not exist.

In another example, the method may further comprise providing a query to the at least one internet connected device.

In another example embodiment, the method may be further performed wherein the data from the at least one internet connected device is related to at least one of communications data from the connected device and communications data to the connected device.

In another example embodiment, the method may be performed wherein the automated response is defined by a playbook.

In another example embodiment, the method may be performed wherein the at least one internet connected device is a gateway.

In another example embodiment, the method may be performed wherein the receiving data from at least one internet connected device located in the field is performed at a cloud monitoring service.

In another example embodiment, the method may be performed wherein the determining when the fault condition exists in the at least one artificial intelligence analysis of the data received from the at least one internet connected device is performed at a cloud monitoring service.

In another example embodiment, the method may further comprise transmitting the presence of the fault condition to a security operations center.

In another example embodiment, the method may be performed wherein the performing the automated response to the fault condition is performed by the security operations center.

In another embodiment, a method of monitoring a computer network and performing an artificial intelligence-based action is disclosed. The method may comprise at least one of receiving data from at least one internet connected device and querying data from the at least one internet connected device at a cloud-based monitoring service. The method may also provide for performing at least one artificial intelligence analysis of the data received from the at least one internet connected device in the cloud-based monitoring service. The method may also provide for determining a presence of a fault condition with the data based on the artificial intelligence analysis of the data received from the at least one internet connected device. The method may further provide for when the fault condition exists, notifying a security operations center of the fault. The method may further provide for at the security operations center, performing an automated response to the fault condition changing at least one parameter of the network and the at least one device. The method may also provide for continuing to receive further data from the at least one internet connected device located in the field, when the fault condition does not exist.

In another example embodiment, the method may be performed wherein the at least one internet connected device is a computer, a gateway, and an industrial internet of things component.

In another example embodiment, the method may be performed wherein the performing the automated response to the fault condition changing at least one parameter of the network and the at least one device is performed through running a playbook.

In another example embodiment, the method may be performed wherein the performing the automated response to the fault condition changing at least one parameter of the network and the at least one device is performed through running a playbook through a cloud interface arrangement of the security operations center.

In another embodiment, an apparatus for performing an automated incident response for a network is disclosed. The apparatus may comprise an automated incident management system configured to manage incidents received from the network, an automated incident handling system configured to conduct automated actions in a network, the automated actions specified by a playbook, wherein the automated incident handling system is configured to change at least one parameter of the network and a security incident event management system configured to aggregate and correlate incidents received from the network.

In another example embodiment, the method may be performed wherein the security incident event management system is configured to aggregate and correlate incidents received from the network.

In another example embodiment, the method may be performed wherein the automated incident management system is configured to manage incidents received from the network;

In another example embodiment, the method may be performed wherein the cloud-based monitoring service is configured with an integration application programming interface.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method of performing a computer network action, comprising:
   receiving data from at least one industrial internet of things (IIOT) device located in a field;
   performing at least one artificial intelligence analysis of the data received from the at least one IIOT device;
   determining presence of a fault condition or event on a network with the data based on the at least one artificial intelligence analysis of the data received from the at least one IIOT device;
   prioritizing a risk of the fault condition or event over a plurality of additional risks associated with a plurality of additional fault conditions or events;
   when the fault condition or event is present, performing an automated action in response to the fault condition or event through the artificial intelligence analysis, wherein the automated action involves changing at least one parameter of the network and at least one parameter of the at least one IIOT device, wherein the automated action is specified and triggered by running a playbook of a plurality of playbooks on a computer-based system that includes a neural network, wherein the neural network is configured to predict the automated action for the fault condition or event with learning capability developed over time, wherein the neural network is configured to assign different weights to a plurality of different fault conditions or events on the network, wherein the neural network is configured to modify the different weights over time based on threat levels of security threats, wherein the plurality of playbooks is set in a hierarchy based on the threat levels of the security threats; and
   continuing to receive further data from the at least one Internet connected IIOT device located in the field, when the fault condition or event is not present.

2. The method according to claim 1, further comprising: providing a query to the at least one IIOT device.

3. The method according to claim 1, wherein the data received from the at least one IIOT device is related to at least one of communications data from the IIOT device and communications data to the IIOT device.

4. The method according to claim 1, wherein the presence of the fault condition or event is determined by a cloud monitoring service.

5. The method according to claim 4, further comprising: transmitting the presence of the fault condition or event to a security operations center.

6. The method according to claim 5, wherein the automated action is performed by the security operations center.

7. The method according to claim 1, wherein the automated action comprises a plurality of stages, wherein the plurality of stages comprise:
   an identification of the fault condition or event;
   a containment of the fault condition or event;
   an eradication of the fault condition or event;
   a recovery of the fault condition or event, wherein the recovery comprises an identification of damaged sections of the network, an update of computer systems, an application of software patches, a restoration of data from a known backup location, or a combination thereof; and
   a follow-up of the fault condition or event.

8. The method according to claim 1, wherein performing the automated action comprises at least two of:
   notifying a security operations center of increased network activity in response to a detection of reconnaissance and probing;
   denying a request to provide an addition to the network in response to a delivery attack;
   disabling access to additional computer resources in response to a system compromise;
   disabling software installation for a purpose not included in a plurality of permissible purposes in response to an installation on an exploited system;
   removing malicious code in response to a malware infection;
   configuring a web server to protect against a flood request in response to a distributed denial of service attack;
   maintaining a list of a plurality of security sensitive installations in response to an unauthorized access to a network;
   shutting down access to a portion of a computer system in response to a breach resulting from an insider malicious actor; or
   monitoring actions and restricting access to pre-authorized security function levels in response to an unauthorized change in privileged access.

9. The method according to claim 8, wherein the automated action is selected from a group consisting of:
   notifying the security operations center of the increased network activity in response to the detection of the reconnaissance and probing;

denying the request to provide the addition to the network in response to the delivery attack;
disabling access to the additional computer resources in response to the system compromise;
disabling the software installation for the purpose not included m the plurality of permissible purposes in response to the installation on the exploited system;
removing the malicious code in response to the malware infection;
configuring the web server to protect against the flood request in response to the distributed denial of service attack;
maintaining the list of the plurality of security sensitive installations in response to the unauthorized access to the network;
shutting down access to the portion of the computer system in response to the breach resulting from the insider malicious actor; and
monitoring the actions and restricting access to the pre-authorized security function levels in response to the unauthorized change in the privileged access.

10. The method according to claim 1, wherein the neural network is configured to perform backward learning by taking errors from calculations and analysis and fine-tuning the automated action in response to the fault condition or event after each successive fault condition or event.

11. The method according to claim 1, further comprising sending the automated action to a privileged module of the IIOT device, wherein the privileged module comprises an edge device.

12. The method of claim 1, wherein receiving the data from the at least one IIOT device located in the field comprises receiving the data at a cloud monitoring service, wherein the data comprises at least one of communications data from the at least one IIOT device and communications data to the at least one IIOT device;
wherein determining the presence of the fault condition or event on the network with the data based on the at least one artificial intelligence analysis of the data received from the at least one IIOT device comprises determining the presence of the fault condition or event by the cloud monitoring service;
when the fault condition or event is present, selectively performing at least one of:
notifying a security operations center of the fault condition or event, and performing the automated action at the security operations center; or
sending the automated action to a privileged module of the IIOT device, wherein the privileged module is an edge device, and performing the automated action at the privileged module of the IIOT device; wherein performing the automated action consists of at least two of:
notifying of increased network activity m response to a detection of reconnaissance and probing;
denying a request to provide an addition to the network in response to a delivery attack;
disabling access to additional computer resources in response to a system compromise;
disabling software installation for a purpose not included in a plurality of permissible purposes in response to an installation on an exploited system;
removing malicious code in response to a malware infection;
configuring a web server to protect against a flood request in response to a distributed denial of service attack;
maintaining a list of a plurality of security sensitive installations in response to an unauthorized access to the network;
shutting down access to a portion of a computer system in response to a breach resulting from an insider malicious actor; and
monitoring actions and restricting access to pre-authorized security function levels in response to an unauthorized change in privileged access.

13. A method of monitoring a network and performing an artificial intelligence-based action, comprising:
at least one of receiving data from at least one industrial internet of things (IIOT) device and querying data from the at least one IIOT device at a cloud-based monitoring service;
performing at least one artificial intelligence analysis of the data received from the at least one IIOT device in the cloud-based monitoring service;
determining presence of a fault condition or event on the network with the data based on the at least one artificial intelligence analysis of the data received from the at least one IIOT device;
prioritizing a risk of the fault condition or event over a plurality of additional risks associated with a plurality of additional fault conditions or events;
when the fault condition or event is present, notifying a security operations center of the fault condition or event, and at the security operations center, performing an automated action in response to the fault condition or event that involves changing at least one parameter of the network and at least one parameter of the at least one IIOT device, wherein the automated action is specified and triggered by running a playbook of a plurality of playbooks on a computer-based system that includes a neural network, wherein the neural network is configured to predict the automated action for the fault condition or event with learning capability developed over time, wherein the neural network is configured to assign different weights to a plurality of different fault conditions or events on the network, wherein the neural network is configured to modify the different weights over time based on threat levels of security threats, wherein the plurality of playbooks is set in a hierarchy based on the threat levels of the security threats; and
continuing to receive further data from the at least one Internet connected IIOT device, when the fault condition or event is not present.

14. The method according to claim 13, wherein the playbook is run through a cloud interface arrangement.

15. The method according to claim 14, wherein the security operations center uses a response module for performing the automated action.

16. The method according to claim 13, comprising managing incidents received from the network.

17. The method according to claim 13, wherein the automated action comprises a plurality of stages, wherein the plurality of stages comprise:
an identification of the fault condition or event;
a containment of the fault condition or event; an eradication of the fault condition or event;
a recovery of the fault condition or event, wherein the recovery comprises an identification of damaged sections of the network, an update of computer systems, an application of software patches, a restoration of data from a known backup location, or a combination thereof; and
a follow-up of the fault condition or event.

18. The method of claim 13, wherein the neural network is configured to monitor one or more common components involved with the fault condition or event and an additional fault condition or event of the plurality of additional fault conditions or events based on a first playbook of the plurality of playbooks comprising cross-referenced information to a second playbook of the plurality of playbooks.

19. The method of claim 13, wherein the neural network is configured to alternate through a plurality of processes in response to their continued failure over time.

20. The method of claim 13, wherein a first playbook of the plurality of playbooks comprises a first constraint of a plurality of constraints, wherein a second playbook of the plurality of playbooks comprises a second constraint, wherein the first constraint is a cost constraint and the second constraint is a system security constraint.

\* \* \* \* \*